Patented Aug. 30, 1927.

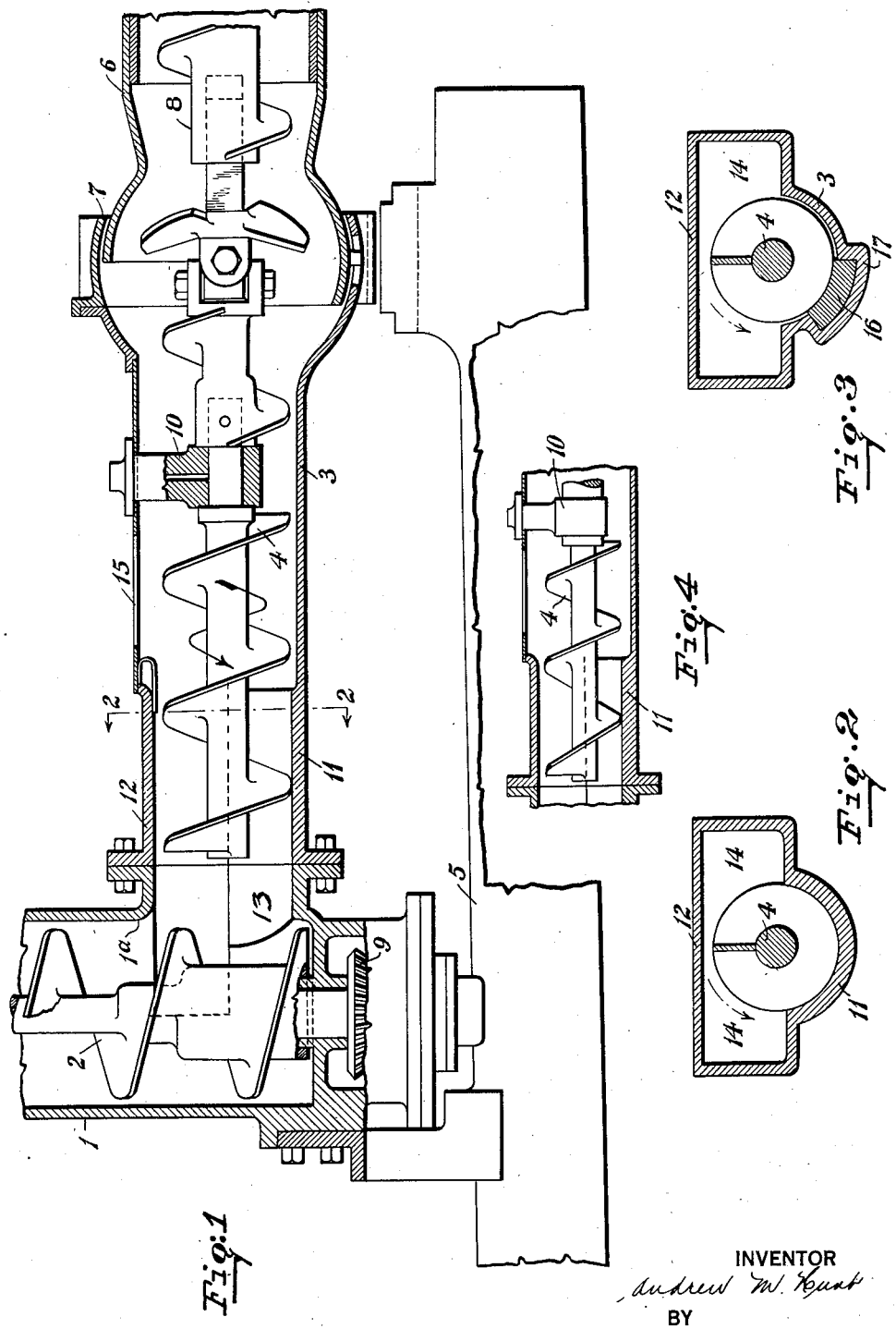

1,640,704

UNITED STATES PATENT OFFICE.

ANDREW M. HUNT, OF NEW YORK, N. Y., ASSIGNOR TO STANDARD STOKER COMPANY, INCORPORATED, OF NEW YORK, N. Y., A CORPORATION OF DELAWARE.

CONVEYER FOR STOKERS.

Application filed May 25, 1923. Serial No. 641,339.

This invention relates to improvements in stokers and more particularly in some of its details to a fuel conveyer of the screw type for stoking apparatus particularly adapted for use in connection with locomotives.

It is a general object of the invention to provide, in a stoking apparatus of the class mentioned, an improved arrangement for effecting free and unobstructed passage of the fuel in the conveyor conduit and avoiding choking or gorging of the fuel therein.

Another object of the invention is to provide in a stoker of the class mentioned an improved arrangement of horizontal and lifting conduits and of the relative arrangement of the conveyer screws therein for avoiding choking of the fuel at the intake end of the lifting conduit thereby providing for the effective delivery of the fuel thereto.

Another object is to provide in a stoker of the class mentioned an improved bearing arrangement for the screw conveyer, avoiding obstruction within the conveyer conduit while at the same time affording an effective bearing on which the screw is rotatably carried.

Other objects will be in part obvious in connection with the following detailed description of an apparatus embodying an exemplification of the invention, and in part pointed out in connection therewith.

The invention accordingly comprises the features of construction, combinations of elements, and arrangement of parts, which will be exemplified in the constructions hereinafter set forth and the scope of the application of which will be indicated in the claims.

For a more complete understanding of the nature and objects of the invention reference should be had to the following detailed description taken in connection with the accompanying drawings, in which.

Fig. 1 is a longitudinal vertical section through a conveyer constructed in accordance with the invention;

Fig. 2 is a section on a line 2—2 of Fig. 1 looking in the direction of the arrows;

Fig. 3 is a section corresponding to Fig. 2, but showing a modified construction; and Fig. 4 is a diagrammatic view showing a modified form of the transferring screw conveyer.

Referring to the drawing for a detailed description of the embodiment there shown, a fragment of the receiving end of an elevating conveyer is disclosed, together with the delivery end of a transferring conveyer joined with the elevating conveyer to deliver fuel thereto. The elevating conveyer includes an elevating conduit 1 and a rotary conveyer screw 2, while the transferring conveyer is provided with a conduit 3 and a screw conveyer 4 rotatably mounted therein. The elevating conveyer is shown as substantially vertical and disposed substantially at right angles to the transferring conveyer, but it is obvious that the relative relationship may be varied in accordance with the use. The embodiment shown is particularly adapted for locomotive installations, the parts of the conveyer shown in Fig. 1 being supported on the locomotive frame shown diagrammatically at 5 and preferably disposed below the cab floor. The vertical conveyer extends from its receiving lower end into the locomotive fire box where the fuel is delivered and distributed by appropriate means.

The transferring conduit is continued rearwardly in a section 6 flexibly connected to section 3 by means of a ball and socket joint 7, the section 6 leading to the coal space in the tender. The transferring conveyer screw is also continued by the screw 8 flexibly coupled to the screw 4. Both conveyer screws are driven by appropriate mechanism, the transferring or horizontal screw preferably being driven by mechanism coupled at the rear end thereof, while the lifting conveyer is driven through mechanism cooperating with the bevel gear 9.

As shown, the screw section 4 may be rotatably supported near the rear end thereof by means of a thrust and supporting bearing 10 disposed within the conduit 3. The forward or delivery end of the screw 4 is rotatably supported directly upon the edges of the screw blade, there being no other bearing at this end. As shown, it is preferable that the lower wall of the conduit 3 be slightly thickened, as indicated at 11, providing a bearing surface slightly raised from the inner surface of the conduit, and adapted to contact directly with the edges of the screw blade which is of substantially uniform diameter throughout. As will be understood this arrangement provides for a slight clearance between the blade and conveyer conduit wall at the rear of the bearing 11. This arrangement is especially advantageous at the delivery end of the conveyer, since the delivery end or mouth of the conduit is left free and unobstructed and the tendency to clogging or choking of the fuel therein is greatly diminished, while at the same time an efficient bearing surface is provided. The bearing 10 may be dispensed with, and a bearing similar to bearing 11 substituted therefor, for supporting this end of the conveyer. It is also to be understood that the obstructionless bearing may be employed elsewhere in the conveyer, its use not being limited to the delivery end of the conveyer. Wherever the bearing 10 is omitted and the other type substituted, less obstruction is offered to the passage of the coal through the conduit, but of course provision must be made for absorbing the longitudinal thrust upon the screw.

In order further to minimize the tendency to choking at the delivery end of the transferring conveyer and to aid the elevating conveyer in starting the coal in its upward passage, the conduit 3 is constructed at its mouth or delivery end of decreased vertical dimension, being slightly flattened at its juncture with the lifting conduit, as shown at 12, forming in the embodiment shown a mouth substantially oblong in cross-section and being very little higher in vertical extent than the diameter of the screw. The transferring conduit is substantially circular throughout the greater part of its extent being flattened preferably only at the portion lying adjacent the delivery mouth, as indicated at 12. It will therefore be seen that at the circular portions of the conduit considerable space is provided above the upper edges of the screw blades, while at the flattened portion the space is practically eliminated.

Upon reference to Fig. 1, it will be seen that the coal or similar fuel is delivered by the transferring conveyer at the delivery end thereof into the space 13 lying between the transferring and elevating conveyers, being forced by the screw 4 into contact with the blades of the elevating conveyer and thereby started in its upward passage. As the coal is raised, there is a tendency for it to fall over the edge of the elevating blade back into the space 13, particularly in the upper part thereof where it is not fully sustained by the pressure of the advancing column of coal in the transferring conveyer. In old forms of conveyer where there was considerable space above the transferring screw there has been considerable choking tendency and stagnation at this point. In the present arrangement, due to the decreased vertical dimensions and changed form of the delivery opening, the coal, almost as soon as it starts its upward movement, arrives opposite the lower part of the wall of the elevating conduit, as indicated at 1ª, this part of the wall functioning as a guard or baffle to prevent the coal from falling off the edge of the elevating blades back into the space 13. Also the extruding effect due to the action of the transferring conveyer is increased by this arrangement, the coal being forced forwardly against the blades of the elevating screw. Choking at this point will therefore be substantially eliminated, and the coal will be raised by the elevating conveyer at the same rate it is delivered thereto by the transferring conveyer. The power required to drive the conveyer will also be lessened and strains, wear and tear, etc. reduced. The cross-sectional area of the delivery opening and the transferring conduit adjacent thereto may be maintained at normal carrying capacity, as by means of the lateral pockets shown at 14, in Fig. 2.

As shown in Fig. 1, an opening 15 is preferably provided in the upper wall of the transferring conduit 3, so the movement of the coal therein may be easily observed by an attendant.

In the modification shown in Fig. 3, the construction of the transferring conduit is substantially the same as that previously described, but a modified form of bearing for the conveyer screw is provided. In this case, the bearing 16 for the delivery end of the conveyer is removably mounted in the conduit, so it may be readily adjusted or replaced as in case of damage or wear. For this purpose, the bottom of the conduit 3 may be provided with a pocket, as indicated at 17, for holding the bearing 16 in place. As shown in the drawing, it is desirable that the bearing 16 be displaced from the center line of the conduit at the side toward which the conveyer rotates, due to the fact that there is a tendency of the conveyer to seek a position at this side. It will be obvious also that this offset arrangement may be employed in the embodiment of Figs. 1 and 2. While the form of bearing shown in Fig. 3 may be employed in certain cases, I find that the form disclosed in Figs. 1 and 2 will in general be satisfactory. The bearing surface 11 in the form shown in Figs. 1 and 2 is subject to very little wear. This, I believe to be due to the fact that the coal in passing forward on to the thickened porton 11 of conduit 3, is forced upwardly against the screw flight and shaft and in this manner tends to raise the screw and relieve the bearing surface from the weight of the screw.

As indicated in Fig. 4, the pitch of the conveyer screw may be increased adjacent the delivery end thereof to hasten the movement of the coal at this point, and thus additionally minimize the tendency to clog at the delivery end of the transferring conduit.

Since certain changes may be made in the above construction and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent, is:

1. In a stoker the combination with an upwardly extending elevating conduit, of a laterally extending feed conduit therefor comprising a lower surface raised at its discharge end and upper surface lowered at its discharge end so as to restrict said conduit vertically at said end, a feed screw of substantially constant diameter extending along said conduit and having its discharge end rotatably supported on the said raised end of said lower surface and within said vertically restricted portion of said conduit, and means for supporting the other end of said feed screw spaced from the walls of said conduit so that said conduit and feed screw have substantially parallel axes.

2. In a stoker the combination with an upwardly extending elevating conduit, of a laterally extending feed conduit therefor comprising a lower surface raised at its discharge end and upper surface lowered at its discharge end so as to restrict said conduit vertically at said end, a feed screw of substantially constant diameter extending along said conduit and having its discharge end rotatably supported on the said raised end of said lower surface and within said vertically restricted portion of said conduit, and means suspended from the upper portion of said conduit for supporting the other end of said feed screw spaced from the walls of said conduit so that said conduit and feed screw have substantially parallel axes.

3. In a stoker the combination with an upwardly extending elevating conduit, of a laterally extending feed conduit therefor comprising a lower surface raised at its discharge end and upper surface lowered at its discharge end so as to restrict said conduit vertically at said end, said conduit also comprising side surfaces spread apart at said discharge end so as to widen the conduit laterally at the area of vertical restriction, a feed screw of substantially constant diameter extending along said conduit and having its discharge end rotatably supported on the said raised end of said lower surface and within said vertically restricted portion of said conduit, and means suspended from the upper portion of said conduit for supporting the other end of said feed screw spaced from the walls of said conduit so that said conduit and feed screw have substantially parallel axes.

4. In a stoker, in combination, a fuel conduit, a conveyer screw rotatably mounted in said conduit for conveying fuel therein, and having a screw blade of substantially constant diameter throughout its extent, and bearing means at the delivery end of said screw having a bearing surface contacting in supporting relationship with the edge of said blade for a portion of the length of said screw at its end, said contact being entirely below the level of the center line of said screw.

5. In a stoker in combination a fuel conduit including a laterally extending portion and an elevating portion in communication with the laterally extending portion, a transferring conveyer screw of substantially constant diameter mounted in said laterally extending conduit, a bearing for the discharge end of said transferring screw having a supporting surface contacting directly with the blade only below the center line thereof and being raised above the inner surface of the conduit so that the feeding material by said screw will tend to lift said screw upward.

6. In a fuel conveyer, in combination a conduit having sections flexibly connected together, a conveyer screw of substantially constant diameter rotatable in said conduit having an intermediate and delivery section flexibly connected together, a supporting and thrust bearing for the delivery screw section disposed intermediate the ends thereof, the corresponding conduit section being formed at its bottom with a thickened raised portion forming a bearing surface, and said last-named screw section having a portion of the screw blade remote from said thrust bearing, rotatably supported directly on said raised bearing portion and below the center line of the screw.

7. In a stoker, in combination, an elevating conduit, a transferring conduit having a delivery mouth communicating with said elevating conduit, an elevating conveyer screw rotatably mounted within said elevating conduit, a transferring conveyer screw rotatably mounted within said transferring conduit and adapted to deliver fuel to said elevating conveyer, said transferring conduit being substantially circular in cross-section for the greater portion of its extent but being laterally flattened near the point of its juncture with the elevating conduit.

8. In a stoker, in combination, an elevating conduit, a transferring conduit having a delivery mouth communicating with said elevating conduit, an elevating conveyer screw rotatably mounted within said elevating conduit, a transferring conveyer screw rotatably mounted within said transferring conduit and adapted to deliver fuel to said elevating conveyer, said transferring conduit being substantially circular in cross-section for the greater portion of its extent but being laterally flattened near the point of its juncture with the elevating conduit, and a bearing surface adjacent the flattened part of said conduit having a surface adapted to contact with the blades of said transferring conveyer screw for rotatably supporting the same.

9. In a stoker in combination, an elevating conduit, an elevating screw therein, a transferring conduit having a delivery mouth communicating with said elevating conduit, a transferring conveyer screw rotatably mounted within said transferring conduit and adapted to deliver fuel to said elevating conduit, and a baffle adjacent said delivery mouth and extending down and along to the top of said transferring conveyer screw, said baffle being formed at the junction of a continuous wall of the elevating conduit and the continuous upper wall of the transferring conduit so as to transfer the fuel directly from one conduit to the other and minimize dropping of the fuel from said elevating screw into said mouth.

10. In a stoker, in combination, an elevating conduit, a conveyer screw therein of approximately the diameter of the conduit, a transferring conduit having delivery opening in communication with the elevating conduit, a transferring conveyer screw adapted to deliver material to the side of the elevating conveyer through said opening, means for rotating said conveyer screws, said transferring conduit at the delivery opening being restricted in vertical dimension to approximately that of the transferring conveyer screw, and having an area substantially equal to that of said transferring conduit beyond said restricted part.

11. In a stoker, in combination, an elevating conduit, a conveyer screw therein of approximately the diameter of the conduit, a transferring conduit having a delivery opening in communication with the elevating conduit, a conveyer screw in said transferring conduit adapted to deliver material to the side of the vertical conveyer through said opening. said transferring conveyer screw being of uniform diameter and supported at its delivery end and below its center line upon the screw blades, providing a free and unobstructed passage-way at and adjacent to said delivery opening.

12. In a stoker, in combination, an elevating conduit, a conveyer screw therein of approximately the diameter of the conduit, a transferring conduit having delivery opening in communication with the elevating conduit, a transferring conveyer screw adapted to deliver material to the side of the vertical conveyer through said opening, means for rotating said conveyer screws, said transferring conduit at the delivery opening being restricted in vertical dimension to approximate that of the transferring conveyer screw, and having an area substantially equal to that of said transferring conduit beyond said restricted part, said transferring conveyer screw being of uniform diameter and supported for rotation at its delivery end upon the screw blades providing a free and unobstructed passage-way at and adjacent to said delivery opening.

13. In a locomotive stoker, in combination, a transferring conduit, a fuel transferring screw rotatable within said conduit, the cross-section of the lower part of said conduit being circular and the upper part oblong and of a greater width than the diameter of said lower part, the radius of said circular section being less at parts thereof so as to form a bearing surface for said screw which is thereby spaced from other parts of said circular section.

14. In a stoker, in combination, an elevating conduit, a transferring conduit communicating therewith, a conveyer screw in said transferring conduit, and a portion of said transferring conduit at its juncture with the elevating conduit being partly cylindrical of substantially the diameter of the screw, the remaining portion at said juncture forming extensions extending laterally of said screw and the vertical diameter of said transferring conduit at said juncture being substantially the diameter of said screw.

15. In a stoker, in combination, an elevating conduit, a transferring conduit communicating therewith, a conveyer screw in said transferring conduit, the lower portion of said transferring conduit at its juncture with the elevating conduit being partly cylindrical of substantially the diameter of the screw, the upper portion at said juncture forming extensions extending laterally of said screw and the vertical diameter of said transferring conduit at said juncture being substantially the diameter of the screw.

16. In a locomotive stoker, in combination, a conveyer including a transfer conduit for conducting fuel from the tender to the locomotive and an elevating conduit extending into the locomotive combustion chamber, said elevating conduit having a delivery opening at the side thereof in communication with said transfer conduit for receiving fuel from the latter, rotary screw members for said transfer conduit and said elevating conduit respectively, said elevating screw being substantially equal in diameter to the diameter of its conduit, and said transfer screw being of substantially less diameter than that of its conduit except adjacent said delivery opening where the conduit is vertically restricted so that the vertical dimensions of the screw and conduit are substantially the same.

17. In a stoker, in combination an elevating conduit, an elevating screw therein of substantially the diameter of the conduit, a transferring conduit communicating with said elevating conduit, a conveyer screw in said transferring conduit, a portion of said transferring conduit at its juncture with said elevating conduit forming extensions extending laterally of said screw, the horizontal width of said transferring conduit at said extensions being at least equal to the diameter of the elevating conduit and greater than the vertical diameter of said transferring conduit, and the vertical diameter of said transferring conduit at said juncture being substantially the diameter of the screw in said transferring conduit.

In testimony whereof I affix my signature.

ANDREW M. HUNT.